United States Patent [19]

Chadwick

[11] 4,115,304

[45] Sep. 19, 1978

[54] HYDROXYL CONTAINING MATERIALS FROM DISTILLATION RESIDUE OBTAINED BY DISTILLING HEXAMETHYLENE DIAMINE FROM A MIXTURE THEREOF WITH BY-PRODUCTS OBTAINED IN THE HYDROGENATION OF ADIPONITRILE TO PRODUCE HEXAMETHYLENE DIAMINE

[75] Inventor: David H. Chadwick, New Martinsville, W. Va.

[73] Assignee: Mobay Chemical Corporation, Pittsburgh, Pa.

[21] Appl. No.: 833,114

[22] Filed: Sep. 14, 1977

[51] Int. Cl.$^2$ .................. C08J 9/00; C08G 63/12; C08G 18/02; C07C 93/04
[52] U.S. Cl. .................. 521/167; 260/22 TN; 260/584 R; 260/584 B; 260/584 C; 260/858; 528/85
[58] Field of Search ... 260/2.5 AQ, 75 NQ, 77.5 AQ, 260/584 R, 584 B, 584 C

[56] References Cited

U.S. PATENT DOCUMENTS

| | | | |
|---|---|---|---|
| 2,511,544 | 6/1950 | Rinke | 260/77.5 AQ |
| 3,284,377 | 11/1966 | Merten et al. | 260/2.5 AQ |
| 3,661,860 | 5/1972 | Schwarz | 260/77.5 AQ |
| 3,663,511 | 5/1972 | Lombardi et al. | 260/75 NQ |

FOREIGN PATENT DOCUMENTS

| | | | |
|---|---|---|---|
| 1,170,628 | 5/1964 | Fed. Rep. of Germany | 260/2.5 AQ |
| 933,147 | 8/1963 | United Kingdom | 260/2.5 AQ |

*Primary Examiner*—Winston A. Douglas
*Assistant Examiner*—John J. Doll
*Attorney, Agent, or Firm*—Gene Harsh; Joseph C. Gil

[57] ABSTRACT

The instant invention is directed to novel hydroxyl containing compositions and the use thereof in producing polyurethane resins. The novel products disclosed herein are hydroxyl containing materials produced by alkoxylating a distillation residue obtained by distilling hexamethylene diamine from a mixture thereof with by-products obtained in the hydrogenation of adiponitrile to produce hexamethylene diamine.

17 Claims, No Drawings

HYDROXYL CONTAINING MATERIALS FROM DISTILLATION RESIDUE OBTAINED BY DISTILLING HEXAMETHYLENE DIAMINE FROM A MIXTURE THEREOF WITH BY-PRODUCTS OBTAINED IN THE HYDROGENATION OF ADIPONITRILE TO PRODUCE HEXAMETHYLENE DIAMINE

BACKGROUND OF THE INVENTION

As is well known in the art, hexamethylene diamine is used extensively in the production of nylon 66. One well-known and commercially applied method of producing hexamethylene diamine is via the hydrogenation of adiponitrile. The various commercial producers utilizing this process do utilize a variety of different raw materials in arriving at adiponitrile. In one method known in the art, cyclohexane is converted to adipic acid which is then converted to adiponitrile by passing adipic acid vapor mixed with ammonia over a dehydrating catalyst. Characteristic of this type of process is that described in British Pat. No. 568,941.

In yet another commercial process, butadiene is chlorinated to dichlorobutenes which are cyanated to dicyanatobutenes, which upon reduction yield adiponitrile. Alternatively, the butadiene may be cyanated directly to yield dicyanatobutenes. Finally, adiponitrile has been produced via an electrolytic process (see, e.g., U.S. Pat. Nos. 3,193,476, 3,193,477, and 3,193,481, and Belgian Pat. No. 649,625).

As is readily apparent, depending upon the process used to make the adiponitrile, the reaction mixture of the hydrogenated product will vary in composition. In general, regardless of the initial process chosen, the hexamethylene diamine is distilled off from the reaction mixture leaving a distillation residue, which among other materials may contain hexamethylene diamine, adiponitrile, bis(hexamethylene) triamine, 1,4-di(aminomethyl)-1-ethylcyclohexane, poly(hexamethylene) polyamines, and small amounts of water, perhaps present by adsorption from the air and the like.

Because the composition of the distillation residue will vary widely from process-to-process and even from batch-to-batch, the distillation residues have found very limited use. To date, they have found limited use in the production of asphalt anti-stripping agents and as curing agents for epoxy resins.

DESCRIPTION OF THE INVENTION

It has now been surprisingly found that novel hydroxyl containing compositions useful in the production of polyurethane resins, which compositions have favorable reactivity and allow for the production of polyurethane foams with high closed cell content, good compressive strength and dimensional stability, can be produced by alkoxylating a distillation residue obtained by distilling hexamethylene diamine from a mixture thereof with by-products obtained in the hydrogenation of adiponitrile to produce hexamethylene diamine. The resultant compositions have low acid numbers, are pourable at room temperature, and, in some instances, even remain liquid when stored at low temperature.

More particularly, the instant invention is directed to alkoxylation products of the distillation residue obtained by distilling hexamethylene diamine from a mixture thereof with by-products obtained in the hydrogenation of adiponitrile to produce hexamethylene diamine. The alkoxylation products of the instant invention can have hydroxyl numbers which vary over a wide range. Generally the hydroxyl number of the products of the instant invention are between 100 and 700 and are preferably from 300 to 500. It is, however, generally preferable that substantially all the active hydrogens attached to the amino groups be alkoxylated. In other words, it is generally preferred that the total amount of secondary nitrogen atoms be less than two percent, and most preferably less than one-half percent of the total weight of the product.

The distillation residues used in the instant invention will vary widely in composition. It has been found that such residues generally contain at least five percent by weight of poly(hexamethylene) polyamines. The remaining constituents will vary in kind and amount from process to process and even from batch-to-batch. For example, the distillation residue produced at a Victoria, Texas hexamethylene diamine production facility has been reported to contain the following components:

| | |
|---|---|
| bis(hexamethylene)triamine | 5 to 40% by wt. |
| C-10 diamines* | 10 to 35% by wt. |
| Hexamethylene diamine and adiponitrile | 2 to 10% by wt. |
| Poly(methylene)polyamines and unknown compounds | 30 to 75% by wt. |

*primarily 1,4-di(aminomethyl)-1-ethylcyclohexane.

This production facility generally reports compositions being from 20 to 35 percent bis(hexamethylene)triamine, 20 to 30 percent C-10 diamine, 2 to 6 percent hexamethylene diamine and adiponitrile and 30 to 50 percent higher boilers.

In yet another hexamethylene diamine production facility, the distillation residue is reported to contain about 50% by weight of bis(hexamethylene)triamine, about 20% by weight of poly(hexamethylene)polyamines, about 20% by weight of unknown compounds and about 10% by weight of water added to reduce the viscosity of the material, with little or no C-10 diamines present.

All of these products may contain traces of ammonia formed by condensation of the amines.

What is particularly surprising about the instant invention is that the utility of the alkoxylated production is not dependent upon the total composition and that the alkoxylated products can be used to make polyurethane foams with properties which are relatively independent of the composition of the distillation residue. In general, however, it is preferred that the total amount of secondary nitrogen in the alkoxylated product be low or else the product may be too reactive. It is certainly not necessary to react all the active hydrogen atoms attached to each amine group (or in other words react all secondary nitrogen) to obtain a useful product which will form a useful polyurethane product. In fact, where the amines are reacted with insufficient amounts of alkylene oxide necessary to react with all the amine groups a faster more reactive product is obtained. For purposes of reproducibility, however, it is generally preferred to react the secondary nitrogen atoms to an extent that the total percent of secondary nitrogen in the product is two or less, preferably one or less, and most preferably is one-half or less (i.e., 0.5%).

The alkoxylation of the distillation residue can be performed in a manner known and recognized in the art for alkoxylation reactions. Although the alkoxylation is preferably conducted without a catalyst, catalysts can be used. Suitable catalysts include sodium hydroxide, potassium hydroxide, sodium metholate, sodium phenolate, potassium acetate, potassium carbonate and the like. Alkoxylation is generally conducted at temperatures in the range of 50° to 200° C. and preferably at temperatures of from 80° to 120° C., although, if desired, the reaction can be conducted at room temperature. The alkylene oxides used generally correspond to the general formula:

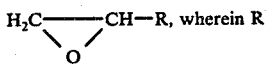, wherein R represents hydrogen, an alkyl group of from one to three carbon atoms, an alkyl group of from one to three carbon atoms substituted with one or more halogen atoms or with a hydroxyl group, or a phenyl group. Specific examples include ethylene oxide, 1,2-propylene oxide, epichlorohydrin, styrene oxide and 1,2-butylene oxide. The presently preferred material is 1,2-propylene oxide. In general, the reaction time is governed by the feed rate of the alkylene oxide such as to permit control of the exotherm. This reaction time can range from three to 48 hours and preferably from three to fourteen hours, followed by a post-reaction or reaction completion time at the above-identified temperatures of from 2 to 3 hours.

In determining the amount of alkylene oxide necessary, it is generally first necessary to analyze the particular distillation residue for nitrogen content. As known in the art, potentiometric titration with $HClO_4$ is an excellent method for the determination of total amine nitrogen content. Additionally, the ammonia content and the water content should be determined. The residue can then be reacted with sufficient alkylene oxide, in the most preferred embodiment, to react with substantially all of the active hydrogen atoms attached to the amine groups. A suitable analytical method of determining nitrogen content and type, i.e., distinguishing among primary, secondary and tertiary nitrogen, is set forth in Siggia, "Quantitative Organic Analysis via Functional Groups", Third Edition, pages 452 through 453 and 502 through 503.

The products of the instant invention can be used to produce polyurethane resins, including lacquers, elastomers and foams.

Suitable reaction components for the production of polyurethane materials are generally known in the art, and generally include polyisocyanates and polyols, and, optionally blowing agents, catalysts and other additives.

The polyisocyanates used in the instant invention include essentially any organic polyisocyanate, including aliphatic, cycloaliphatic, araliphatic, aromatic and heterocyclic polyisocyanates of the type described for example by W. Siefgen in Justus Liebigs Annalen der Chemie, 562, pages 75 to 136. Specific examples include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and, mixtures of these isomers; 1-isocyanato-3,3,5-trimethyl-5-isocyanatomethyl-cyclohexane (German Auslegeschrift No. 1,202,785); 2,4- and 2,6-hexahydrotolylene diisocyanate, and mixtures of these isomers; hexahydro-1,3- and/or -1,4-phenylene diisocyanate; perhydro-2,4'- and/or -4,4'-diphenyl methane diisocyanate; 1,3- and 1,4-phenylene diisocyanate; 2,4- and 2,6-tolylene diisocyanate, and mixtures of these isomers; diphenylmethane-2,4'- and/or -4,4'-diisocyanate; naphthylene-1,5-diisocyanate; triphenylmethane-4,4',4''-triisocyanate; polyphenyl polymethylene polyisocyanates of the type obtained by condensing analine with formaldehyde, followed by condensation, and described for example, in British Pat. No. 874,430 and 848,671; perchlorinated arylpolyisocyanates of the type described in German Auslegeschrift No. 1,157,601; polyisocyanates containing carbodiimide groups of the type described in German Pat. No. 1,092,007; diisocyanates of the type described in U.S. Pat. No. 3,492,330; polyisocyanates containing allophanate groups of the type described in British Pat. No. 994,890, Belgian Pat. No. 761,262 and published Dutch Patent Application No. 7,102,524; polyisocyanates containing isocyanurate groups of the type described in German Pat. Nos. 1,022,789, 1,222,067, and 1,027,394, the German Offenlegungsschriften No. 1,929,034, and 2,004,048; polyisocyanates containing urethane groups of the type described in Belgian Pat. No. 752,261 or in U.S. Pat. No. 3,394,164; polyisocyanates containing acylated urea groups as described in German Pat. No. 1,230,778; polyisocyanates containing biuret groups of the type described in German Pat. No. 1,101,394, in British Pat. No. 889,050, and in French Pat. No. 7,017,514; polyisocyanates obtained by telomerization reactions of the type described in Belgian Pat. No. 723,640; polyisocyanates containing ester groups of the type described, in British Pat. No. 965,474 and 1,072,956, in U.S. Pat. No. 3,567,763 and in German Pat. No. 1,231,688; and, reaction products of the aforementioned isocyanates with acetals according to German Pat. No. 1,072,385.

It is also possible to use the distillation residues containing isocyanate groups of the type accumulating in the commercial production of isocyanates, optionally in solution in one or more of the aforementioned polyisocyanates. It is also possible to use mixtures of the aforementioned polyisocyanates.

As a rule, it is preferred to use readily available polyisocyanates such as 2,4- and 2,6-tolylene diisocyanate and mixtures of these isomers ("TDI"); polyphenyl polymethylene polyisocyanates of the type obtained by condensing aniline with formaldehyde, followed by phosgenation ("crude MDI"); and, polyisocyanates containing carbodiimide groups, urethane groups, allophanate groups, isocyanurate groups, urea groups or biuret groups ("modified polyisocyanates").

Other starting components suitable for use in accordance with the invention are compounds with at least two isocyanate-reactive hydrogen atoms and a molecular weight of from 62 to 10,000. Such compounds include those containing amino groups, thiol groups, hydroxyl groups, or carboxyl groups. The presently preferred compounds are the polyhydroxyl compounds, more especially polyhydroxyl compounds containing from 2 to 8 hydroxyl groups, and especially those with molecular weights of from 200 to 10,000, and most preferably from 1000 to 6000. Examples include polyesters, polyethers, polythioethers, polyacetals, polycarbonates, and polyester amides containing at least 2, generally from 2 to 8 and more preferably from 2 to 4 hydroxyl groups, of the type generally known for the production of homogeneous and cellular polyurethanes. In the process according to the invention, the aforementioned relatively high molecular weight polyhydroxyl compounds are often used in admixture with up to 95%, by weight, preferably with up to 50%, by weight, based on the total quantity of polyhydroxyl compounds, of low molecular weight polyols with molecular weights of from 62 to 200. Low molecular weight polyols of this type include ethylene glycol 1,2-propane diol, 1,3-propane diol, 1,2-butane diol, 1,4-butane diol, 1,6-hexane diol, 1,10-decane diol, diethylene glycol, triethylene glycol, tetraethylene glycol, dipropylene glycol, tripropylene glycol, glycerol, trimethylolpropane and the like.

Suitable hydroxyl-group-containing polyesters include reaction products of polyhydric, preferably dihydric and, optionally, also trihydric alcohols with polyvalent, and preferably divalent, carboxylic acids. Instead of using the free polycarboxylic acids, it is also possible to use the corresponding polycarboxylic acid anhydrides of corresponding polycarboxylic acid esters of lower alcohols or mixtures thereof for producing the polyesters. The polycarboxylic acids may be aliphatic, cycloaliphatic, aromatic and/or heterocyclic and may optionally be substituted, by for example halogen atoms, and/or be unsaturated. Examples of polycarboxylic acids of this type include: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetra-hydrophthalic acid anhydride, glutaric acid anhydride, maleic acid, maleic acid anhydride, fumaric acid, dimeric and trimeric fatty acids, such as oleic acid, optionally in admixture with monomeric fatty acids, terephthalic acid dimethyl ester and terephthalic acid bis-glycol ester. Examples of suitable polyhydric alcohols include: ethylene glycol, 1,2-propylene glycol and 1,3-propylene glycol, 1,4- and 2,3-butylene glycol, 1,6-hexane diol, 1,8-octane diol, neopentyl glycol, cyclohexane dimethanol (1,4-bis-hydroxymethyl cyclohexane), 2-methyl-1,3-propane diol, glycerol, trimethylolpropane, 1,2,6-hexane triol, 1,2,4-butane triol, trimethylolethane, pentaerythritol, quinitol, mannitol and sorbitol, methyl glycoside, also diethylene glycol, triethylene glycol, tetraethylene glycol, polyethylene glycols, dipropylene glycol, polypropylene glycols, dibutylene glycol and polybutylene glycols. The polyesters may also contain some terminal carboxyl groups. Polyesters of lactones, for example, ε-caprolactone, or hydroxycarboxylic acids, for example ω-hydroxy caproic acid, may also be used.

The polyethers containing at least 2, generally 2 to 8, preferably 2 to 3, hydroxyl groups suitable for use in accordance with the invention are also known and may be obtained, for example, by polymerizing epoxides, such as ethylene oxide, propylene oxide, butylene oxide, tetrahydrofuran, styrene oxide or epichlorhydrin in the presence of $BF_3$, or by chemically adding these epoxides, optionally in admixture or successively to components containing reactive hydrogen atoms, such as water, alcohols or amines. These components include then, water, ethylene glycol, 1,3-propylene glycol or 1,2-propylene glycol, trimethylolpropane, 4,4'-dihydroxy diphenylpropane, aniline, ammonia, ethanolamine and ethylene diamine. Sucrose polyethers of the type described in German Auslegeschriften No. 1,176,358 and 1,064,938 may also be used in accordance with the invention. In many cases, it is preferred to use polyethers of the type which contain substantial amounts of primary OH-groups (up to 90% by weight, based on all the OH-groups present in the polyether). Polyethers modified by vinyl polymers, of the type formed, for example, by polymerizing styrene, acrylonitrile in the presence of polyethers (U.S. Pat. Nos. 3,383,351, 3,304,273, 3,523,093, and 3,110,695, and German Pat. No. 1,152,536), are also suitable, as are polybutadienes containing OH-groups.

Among the polythio ethers, reference is made in particular to the condensation products of thiodiglycol with itself and/or with other glycols, dicarboxylic acids, formaldehyde, aminocarboxylic acids or amino alcohols. The products are polythio mixed ethers, polythio ether esters or polythio ether ester amides, depending upon the cocomponents.

Examples of suitable polyacetals are the compounds obtainable from glycols, such as diethylene glycol, triethylene glycol, 4,4'-dioxethoxy diphenyl dimethylmethane, hexane diol, and formaldehyde. Polyacetals suitable for use in accordance with the invention may also be obtained by polymerizing cyclic acetals.

Suitable polycarbonates containing hydroxyl groups are known and may be obtained, for example, by reacting diols, such as 1,3-propane diol, 1,4-butane diol and/or 1,6-hexane diol, diethylene glycol, triethylene glycol, tetraethylene glycol, with diaryl carbonates such as diphenyl carbonate, or phosgene.

The polyester amides and polyamides include, for example, the predominantly linear condensates obtained from polyvalent saturated and unsaturated carboxylic acids or their anhydrides and polyhydric, saturated and unsaturated amino alcohols, diamines, polyamines and mixtures thereof.

Polyhydroxyl compounds already containing urethane or urea groups and optionally modified natural polyols, such as castor oil, carbohydrates, starch, may also be used. Addition products of alkylene oxides with phenol-formaldehyde resins or even with urea-formaldehyde resins may also be used in accordance with the invention.

Representatives of the many and varied compounds usable in accordance with the invention may be found, for example, in High Polymers, Vol. XVI "Polyurethanes, Chemistry and Technology", by Saunders-Frisch, Interscience Publishers, New York, London, Vol. I, 1962, pages 32 to 42 and pages 44 to 54, and Vol. II, 1964, pages 5 to 6 and 198 to 199; and, in Kunststoff-Handbuch, Vol. VII, Vieweg-Hochtlen, Carl-Hanser-Verlag, Munich, 1966, pages 45 to 71.

In general, the hydroxyl containing compounds of the instant invention are based on amounts of from about 15 percent to about 65 percent by weight based on the total amount of active hydrogen containing material.

In the process according to the invention, the reactants (including the water optionally used as blowing agent) are used in quantitative ratios corresponding to an NCO-characteristic of 70 to 160. (The NCO-characteristic 100 signifies the presence of equivalent quantities of isocyanate groups in the reaction mixture.)

According to the invention, water and/or readily volatile organic substances are often used as blowing agents. Examples of organic blowing agents include: acetone; ethylacetate; methanol; ethanol; halogen-substituted alkanes such as methylene chloride, chloroform, ethylidene chloride, vinylidene chloride, monofluorotrichloromethane, chlorodifluoromethane, and dichloro difluoromethane; butane; hexane; heptane; diethyl ether; and the like. A blowing effect may also be obtained by adding compounds which decompose at temperatures above room temperature, giving off gases (for example nitrogen). Such compounds include azo compounds, such as azoisobutyronitrile. Other examples of blowing agents and details of their use may be found in Kunststoff-Handbuch, Vol. VII, Vieweg and Hochtlen, Carl-Hanser-Verlag, Munich, 1966, pages 108 and 109, 435 to 455 and 507 to 510.

In addition, catalysts are often used in accordance with the invention. Suitable catalysts include tertiary amines, such as triethylamine, tributylamine, N-methyl morpholine, N-ethyl morpholine, N-coco morpholine, N,N,N',N''-tetramethylethylene diamine, 1,4-diazabicyclo-(2,2,2)octane, N-methyl-N'-dimethylamino ethyl piperazine, N,N-dimethylbenzylamine, bis-(N,N-diethylamine ethyl)-adipate, N,N-diethylbenzylamine, pentamethyl diethylene triamine, N,N-dimethyl cyclohexylamine, N,N,N',N'-tetramethyl-1,3-butane diamine, N,N-dimethyl-β-phenylethylamine, 1,2-dimethylimidazole and 2-methylimidazole.

Tertiary amines containing isocyanate-reactive hydrogen atoms can also be used and include triethanolamine, triisopropanolamine, N-methyl diethanolamine, N-ethyl diethanolamine, N,N-dimethylethanolamine, and their reaction products with alkylene oxides, such as propylene oxide and/or ethylene oxide.

Other suitable catalysts include silaamines with carbon-silicon bonds of the type described in German Pat. No. 1,229,290, such as 2,2,4-trimethyl-2-sila morpholine and 1,3-diethylamino methyl tetramethyl disiloxane.

Other suitable catalysts include nitrogen-containing bases such as tetraalkyl ammonium hydroxides; alkali hydroxides, such as sodium hydroxide; alkali phenolates, such as sodium phenolate; or alkali alcoholates, such as sodium methylate. Hexahydrotriazines may also be used as catalysts. According to the invention, organometallic compounds such as organo tin compounds, may also be used as catalysts.

Preferred organo tin compounds are tin (II) salts of carboxylic acids, such as tin (II) acetate, tin (II) octoate, tin (II) ethyl hexoate and tin (II) laurate, and the dialkyl tin salts of carboxylic acids, such as dibutyl tin diacetate, dibutyl tin dilaurate, dibutyl tin maleate or dioctyl tin diacetate.

Further representatives of catalysts suitable for use in accordance with the invention, and particulars of the way in which the catalysts work, may be found in Kunststoff-Handbuch, Vol. VII, Vieweg and Hochtlen, Carl-Hanser-Verlag, Munich, 1966, pages 96 to 102.

The catalysts are generally used in a quantity of from about 0.001 to 10%, by weight, based on the quantity of compounds with at least two isocyanate-reactive hydrogen atoms and molecular weights of from 62 to 10,000.

According to the invention, it is also possible to use surface-active additives (emulsifiers and foam stabilizers). Examples of suitable emulsifiers include the sodium salts of castor oil sulphonates; the sodium salts of fatty acids; the salts of fatty acids with amines, such as oleic acid/diethylamine or stearic acid/diethanolamine. Alkali or ammonium salts of sulphonic acids such as dodecyl benzene sulphonic acid or dinaphthylmethane disulphonic acid; of fatty acids, such as ricinoleic acid; or, of polymeric fatty acids, may also be used as surface-active additives.

Suitable foam stabilizers include water-soluble polyether siloxanes. These compounds are generally synthesized in such a way that a copolymer of ethylene oxide and propylene oxide is attached to a polydimethyl siloxane radical. Foam stabilizers of this type are described in U.S. Pat. No. 3,201,372.

According to the invention, it is also possible to use reaction retarders such as acid-reacting substances, such as hydrochloric acid or organic acid halides; cell regulators such as paraffins or fatty alcohols or dimethyl polysiloxanes; pigments; dyes; flame-proofing agents such as tris-chloroethylphosphate or ammonium phosphate and polyphosphate; stabilizers against ageing and weathering; plasticizers; fungistatic and bacteriostatic agents; and, fillers, such as barium sulphate, kieselguhr, carbon black or whiting.

Other examples of the many and varied additives which may be used in the instant invention, together with particulars on the way in which these additives are used and the manner in which they work, may be found in Kunststoff-Handbuch, Vol. VI, Vieweg and Hochtlen, Carl-Hanser-Verlag, Munich, 1966, for example on pages 103 to 113.

The starting components can be reacted together by the known one-step process, prepolymer process a semi-prepolymer process. Details concerning processing apparatus which may also be used according to the invention may be found in Kunststoff-Handbuch, Vol. VI, published by Vieweg & Hochtlen, Carl-Hanser-Verlag, Munich, 1966, pages 121 to 205.

In each of Examples 1 through 4, the distillation residue used was obtained from a Victoria, Texas hexamethylene diamine production facility and was reported to contain the following components:

| | |
|---|---|
| bis(hexamethylene)triamine | 5 to 40% by wt. |
| C-10 diamine (primarily 1,4-di(aminomethyl)-1-ethyl cyclohexane) | 10 to 35% by wt. |
| hexamethylene diamine and adiponitrile | 2 to 10% by wt. |
| poly(hexamethylene)-polyamines and unknown compounds | 30 to 75% by wt. |
| water | trace |
| ammonia | trace |

In each instance, the distillation residue was analyzed for nitrogen content via the art recognized potentiometric titration method, described in the Siggia reference noted herein, prior to reaction with the alkylene oxide.

Unless otherwise specified all parts and percents are by weight.

EXAMPLES

EXAMPLE 1

The distillation residue used in Example 1 had the following analysis:

| | |
|---|---|
| % primary nitrogen (including ammonia) | 9.60 |
| % nitrogen present as ammonia | 0.10 |
| % secondary nitrogen | 1.66 |
| % tertiary nitrogen | 0.26 |
| % total nitrogen | 11.52 |
| % water | 0.90 |

Into a pressure reactor equipped with heating means and stirrer were charged about 60 parts by weight of the distillation residue and about 90 parts by weight of propylene oxide. The reactants were allowed to react at room temperature for about 24 hours. The reaction mixture was then gradually heated to about 80° C. and maintained at that temperature for another 24 hours.

The resultant product had an OH number of 361, a percent nitrogen of 4.66, a percent secondary nitrogen of 0.43 and a percent water of 0.45.

EXAMPLE 2

The distillation residue used in Example 2 had the following analysis:

| % primary nitrogen | 9.88 |
| % nitrogen present as ammonia | 0.10 |
| % secondary nitrogen | 2.27 |
| % tertiary nitrogen | 0.198 |
| % total nitrogen | 12.45 |
| % water | 1.21 |

Into a reactor equipped with heating means, stirrer, and reflux condenser, and padded with nitrogen to a pressure of 6 p.s.i.g., were charged about 3700 parts of the distillation residue. About 3300 parts of propylene oxide were added over a period of 15 hours while maintaining the reaction temperature at about 105° C. The mixture was held at 105° C. for an additional two hours and then cooled to room temperature.

The resultant product had an OH number of 462, a percent nitrogen of 6.55, a percent secondary nitrogen of 0.164, a percent water of 0.078 and a Brookfield viscosity at 25° C. of 81,500 cps.

EXAMPLE 3

The distillation residue used in Example 3 had the following analysis:

| % primary nitrogen | 8.3 |
| % nitrogen present as ammonia | 0.09 |
| % secondary nitrogen | 1.89 |
| % tertiary nitrogen | 1.37 |
| % total nitrogen | 11.65 |
| % water | 0.21 |

Into a pressure reactor equipped with heating means, stirrer, and reflux condenser were charged about 3700 parts of the distillation residue. The pressure was maintained at about 6 p.s.i.g. with nitrogen. Over a period of about 9 hrs. 2600 parts of propylene oxide were added while the temperature was maintained at 100° to 110° C. The resultant product had an OH number of 462, a water content of 0.07 percent, a total nitrogen content of 6.88 percent, a secondary nitrogen content of about 1.5 percent and a Brookfield viscosity at 25° C. of 154,000 cps.

EXAMPLE 4

The distillation residue used in this example was the same as that used in Example 3.

The procedure used in this example was similar to Example 3 except that a greater amount of propylene oxide was used. The resultant product had an OH number of 419, a water content of 0.04 percent, a nitrogen content of 6.11 percent, a secondary nitrogen content of 0.4 percent, and a Brookfield viscosity at 25° C. of 115,000 mPas.

EXAMPLE 5

The distillation residue used in this example was obtained from an Orange, Texas hexamethylene diamine production facility. It had the following analysis:

| % primary nitrogen | 4.81 |
| % secondary nitrogen | 1.72 |
| % tertiary nitrogen | 1.95 |
| % total nitrogen | 8.51 |
| % nitrogen present as ammonia | 0.03 |

Into a pressure reactor equipped with heating means, stirrer and reflux condenser were charged about 100 parts of the distillation residue. 47 parts of propylene oxide were added and the temperature was gradually raised to 80° C. The reaction mixture was maintained at about 80° C. for 48 hours and was then allowed to cool to room temperature.

The resultant product had an OH number of 380, a nitrogen content of 5.81 percent, a secondary nitrogen content of 0.76 percent.

EXAMPLES 6 THROUGH 13

The hydroxyl containing products of Examples 1, 2, 3 and 4 were used to prepare polyurethane foam products. The ingredients set forth in the Table were mixed in the amounts shown by hand, poured into a mold and allowed to foam. The resultant products had good, uniform cellularity and showed substantially no problems in mixing. The hand-mix reactivities, as indicated by cream times, gel times, tack free times and rise times were as set forth in the Table.

TABLE

| Example No. Ingredients | 6 | 7 | 8 | 9 | 10 | 11 | 12 | 13 |
| --- | --- | --- | --- | --- | --- | --- | --- | --- |
| Polyol of Example 1 | 36.0 | — | — | — | — | — | — | — |
| Polyol of Example 2 | — | 20 | 20 | 20 | 20 | — | — | — |
| Polyol of Example 3 | — | — | — | — | — | 20 | — | — |
| Polyol of Example 4 | — | — | — | — | — | — | 20 | 20 |
| POLYETHER A[a] | — | 70 | — | — | 70 | 70 | 70 | — |
| POLYETHER B[b] | 36.9 | — | 70 | — | — | — | — | 70 |
| POLYETHER C[c] | — | — | — | 70 | — | — | — | — |
| FYROL-6[d] | — | 10 | 10 | 10 | 10 | 10 | 10 | 10 |
| Water | 0.7 | 0.5 | 0.5 | 0.5 | 0.5 | 0.5 | 0.5 | 0.5 |
| DC-193[e] | 1.5 | 1.5 | 1.5 | 1.5 | 1.5 | 1.5 | 1.5 | 1.5 |
| DABCO-R-8020[f] | — | 1.0 | 1.0 | 1.0 | 1.0 | 1.0 | 0.7 | 1.0 |
| R-11-B[g] | 21.3 | 30 | 30 | 30 | 30 | 30 | 30 | 30 |
| 33 LV[h] | 2.2 | — | — | — | — | — | — | — |
| POLYISO-CYANATE A[i] | — | 111.2 | 125.6 | 128.7 | — | — | — | — |
| POLYISO-CYANATE B[j] | — | — | — | — | 111 | 111 | 111.2 | 122.5 |
| POLYISO- | | | | | | | | |

TABLE-continued

| | CYANATE C[k] | | | | | | | |
|---|---|---|---|---|---|---|---|---|
| Reactivity (seconds) | 69.3 | — | — | — | — | — | — | — |
| Cream Time | 5 | 30 | 35 | 15 | 30 | 12 | 27 | 36 |
| Gel Time | 30 | 95 | 105 | 50 | 85 | 55 | 90 | 105 |
| Tack-free Time | 40 | 165 | 155 | 60 | 125 | 85 | 130 | 160 |
| Rise Time | 50 | 230 | 215 | 85 | 160 | 110 | 180 | 190 |

[a]POLYETHER A = a modified sucrose polyol having an OH number of about 380.

[b]POLYETHER B = a propoxylated propylene oxide adduct of sucrose polyol having an OH number of about 470.

[c]POLYETHER C = an ethylene oxide/propylene oxide adduct of toluene diamine having an OH number of about 470.

[d]FYROL-6 = a bis(hydroxyethyl)amino methane phosphonate ester polyether polysiloxane.

[e]DC-193 = a polyether polysiloxane surfactant.

[f]DABCO-R-8020 = a solution of 80 parts of triethylene diamine and 20 parts of dimethylethanolamine.

[g]R-11-B = Freon blowing agent.

[h]33 LV = a solution of 33 parts of triethylene diamine and 67 parts of dipropylene glycol.

[i]POLYISOCYANATE A = a polyphenylpolymethylene polyisocyanate containing about 50 percent by weight of diphenylmethane diisocyanate of which about 17 percent by weight is the 2,4'-isomer and having an isocyanate content of about 32 percent.

POLYISOCYANATE B = a polyphenylpolymethylene polyisocyanate containing about 50 percent by weight of diphenylmethane diisocyanate of which about 2.5 percent by weight is the 2,4'-isomer and having an isocyanate content of about 32 percent.

POLYISOCYANATE C = an isocyanate blend, having an isocyanate content of 30 percent by weight and consisting of
(a) a prepolymer of POLYETHER C and tolylene diisocyanate;
(b) tolylene diisocyanate, and
(c) a polyphenylpolymethylene polyisocyanate having an isocyanate content of about 32 percent.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A hydroxyl containing composition comprising the alkoxylated product of a distillation residue obtained by distilling hexamethylene diamine from a mixture thereof with by-products obtained in the hydrogenation of adiponitrile to produce hexamethylene diamine.

2. The composition of claim 1 wherein the OH number of said alkoxylated product is from 100 to 700.

3. The composition of claim 2 wherein said OH number is from 300 to 500.

4. The composition of claim 1 wherein the secondary nitrogen content of the alkoxylated product is less than two percent by weight.

5. The composition of claim 4 wherein the secondary nitrogen content of the alkoxylaed product is less than one percent by weight.

6. The composition of claim 5 wherein the secondary nitrogen content of the alkoxylated product is less than one-half percent by weight.

7. The composition of claim 1 wherein said distillation residue contains the following components:
   (a) from 5 to 40 percent by weight of bis(hexamethylene)triamine;
   (b) from 10 to 35 percent by weight of C-10 diamines, primarily 1,4-di(aminomethyl)-1-ethylcyclohexane;
   (c) from 2 to 10 percent by weight of hexamethylene diamine and adiponitrile, and
   (d) from 30 to 75 percent by weight of poly(methylene)polyamines and unknown compounds.

8. A process for producing a hydroxyl containing composition comprising alkoxylating a distillation residue obtained by distilling hexamethylene diamine from a mixture thereof with by-products obtained in the hydrogenation of adiponitrile to produce hexamethylene diamine.

9. The process of claim 8 wherein said alkoxylation is conducted in the absence of an added alkoxylation catalyst.

10. The process of claim 8 wherein said alkoxylation is conducted in the presence of an added alkoxylation catalyst.

11. In a process for the production of a polyurethane resin by reacting an organic polyisocyanate, an organic hydroxyl group containing material, a chain extender, and optionally catalysts and blowing agents, the improvements wherein said chain extender comprises a hydroxyl containing composition comprising the alkoxylated product of a distillation residue obtained by distilling hexamethylene diamine from a mixture thereof with by-products obtained in the hydrogenation of adiponitrile to produce hexamethylene diamine.

12. The process of claim 11 wherein the OH number of said alkoxylated product is from 100 to 700.

13. The process of claim 12 wherein said OH number is from 300 to 500.

14. The process of claim 11 wherein the secondary nitrogen content of the alkoxylated product is less than two percent by weight.

15. The process of claim 14 wherein said content is less than one percent by weight.

16. The process of claim 15 wherein said content is less than one-half percent by weight.

17. The polyurethane product produced according to the process of claim 11.

* * * * *